United States Patent
Englund et al.

(10) Patent No.: US 10,304,582 B2
(45) Date of Patent: *May 28, 2019

(54) POLYMER COMPOSITION FOR ELECTRICAL DEVICES

(75) Inventors: Villgot Englund, Gothenburg (SE); Per-Ola Hagstrand, Stenungsund (SE)

(73) Assignee: Borealis AG, Vienna (AT)

( * ) Notice: Subject to any disclaimer, the term of this patent is extended or adjusted under 35 U.S.C. 154(b) by 1031 days.

This patent is subject to a terminal disclaimer.

(21) Appl. No.: 14/115,113

(22) PCT Filed: May 3, 2012

(86) PCT No.: PCT/EP2012/058079
§ 371 (c)(1),
(2), (4) Date: Dec. 2, 2013

(87) PCT Pub. No.: WO2012/150286
PCT Pub. Date: Nov. 8, 2012

(65) Prior Publication Data
US 2014/0124238 A1    May 8, 2014

(30) Foreign Application Priority Data
May 4, 2011   (EP) .................... 11164782

(51) Int. Cl.
| H01B 3/30 | (2006.01) |
| H01B 3/44 | (2006.01) |
| C08K 3/26 | (2006.01) |
| C08K 5/098 | (2006.01) |
| C08K 5/00 | (2006.01) |
| C08L 23/06 | (2006.01) |

(52) U.S. Cl.
CPC ............... *H01B 3/30* (2013.01); *C08K 3/26* (2013.01); *H01B 3/441* (2013.01); *C08K 5/005* (2013.01); *C08K 5/098* (2013.01); *C08L 23/06* (2013.01); *Y10T 428/2913* (2015.01)

(58) Field of Classification Search
CPC .......... C08L 23/06; C08K 3/26; C08K 5/005; C08K 5/098; C08K 3/00; C08K 3/014; C08K 3/22; H01B 3/30; H01B 3/441; H01L 33/30; Y10T 428/2913; Y10T 428/294; Y10T 428/2933
See application file for complete search history.

(56) References Cited

U.S. PATENT DOCUMENTS

| 4,623,755 A | 11/1986 | Henkel et al. |
| 6,162,548 A * | 12/2000 | Castellani ............... C08K 3/22 428/500 |

(Continued)

FOREIGN PATENT DOCUMENTS

| CN | 1175065 | 3/1998 |
| CN | 1711313 | 12/2005 |

(Continued)

OTHER PUBLICATIONS

Japanese Search Report dated Aug. 20, 2016.

*Primary Examiner* — Jennifer A Steele
(74) *Attorney, Agent, or Firm* — Eversheds Sutherland (US) LLP

(57) ABSTRACT

The present invention relates to a use of a polymer composition preferably in electrical devices as well as to a cable surrounded by at least one layer including the polymer composition.

8 Claims, 1 Drawing Sheet

(56) References Cited

U.S. PATENT DOCUMENTS

| | | | |
|---|---|---|---|
| 6,255,399 B1* | 7/2001 | Castellani | C08K 3/22 |
| | | | 174/102 SC |
| 6,610,401 B2* | 8/2003 | Castellani | C08L 23/0815 |
| | | | 174/110 PM |
| 2002/0034689 A1 | 3/2002 | Hoshida et al. | |
| 2002/0042451 A1 | 4/2002 | Sugaya | |
| 2004/0091631 A1* | 5/2004 | Belli | H01B 3/20 |
| | | | 427/430.1 |
| 2004/0138351 A1 | 7/2004 | Kaprinidis et al. | |
| 2004/0168820 A1* | 9/2004 | Kanamori | C08F 255/02 |
| | | | 174/110 R |
| 2004/0210002 A1 | 10/2004 | Haekoenen et al. | |
| 2006/0055075 A1 | 3/2006 | Hoshida et al. | |
| 2006/0142458 A1* | 6/2006 | Pang | B82Y 30/00 |
| | | | 524/444 |
| 2006/0151758 A1 | 7/2006 | Reyes | |
| 2007/0299173 A1 | 12/2007 | Wolfschwenger et al. | |
| 2008/0315159 A1 | 12/2008 | Minagoshi | |
| 2009/0238957 A1* | 9/2009 | Clancy | C08L 23/02 |
| | | | 427/117 |
| 2010/0086268 A1 | 4/2010 | Reyes | |
| 2011/0042624 A1 | 2/2011 | Minagoshi | |
| 2011/0196078 A1 | 8/2011 | Wolfschwenger et al. | |
| 2013/0175068 A1* | 7/2013 | Sutton | C08L 23/06 |
| | | | 174/110 SR |
| 2013/0199817 A1* | 8/2013 | Nilsson | C08L 23/06 |
| | | | 174/102 SC |

FOREIGN PATENT DOCUMENTS

| | | | | |
|---|---|---|---|---|
| DE | 2930521 | * | 3/1980 | C08L 23/06 |
| EP | 0517868 B1 | | 11/1995 | |
| EP | 0688794 B1 | | 8/1998 | |
| EP | 1168469 A2 | | 1/2002 | |
| EP | 11211289 A1 | | 6/2002 | |
| EP | 0810235 B1 | | 11/2004 | |
| EP | 1484345 A1 | | 12/2004 | |
| EP | 1669403 A1 | | 6/2006 | |
| JP | 2018811 | | 1/1990 | |
| JP | 04-322009 | | 11/1992 | |
| JP | 4322009 | | 11/1992 | |
| JP | 547215 | | 2/1993 | |
| JP | 19970129039 | | 5/1997 | |
| JP | 2001266650 | * | 9/2001 | C08K 3/24 |
| WO | 2001/037289 A1 | | 5/2001 | |
| WO | 2003/000754 A1 | | 1/2003 | |
| WO | 2004/041919 A2 | | 5/2004 | |
| WO | 2010003651 A1 | | 1/2010 | |

* cited by examiner

US 10,304,582 B2

POLYMER COMPOSITION FOR ELECTRICAL DEVICES

FIELD OF INVENTION

The invention relates to a polymer composition for producing an electrical or communication device, preferably a layer of a cable, preferably of a power cable, more preferably of a direct current (DC) power cable, to a cable, preferably a power cable, more preferably a direct current (DC) power cable, which comprises the polymer composition and is optionally crosslinkable and subsequently crosslinked, as well as to a preparation process of the cable.

BACKGROUND ART

Polyolefins are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order. The cables are commonly produced by extruding the layers on a conductor. Power cable is defined to be a cable transferring energy operating at any voltage level. The voltage applied to the power cable can be alternating (AC), direct (DC) or transient (impulse). Moreover, power cables are typically indicated according to their level of operating voltage, e.g. a low voltage (LV), a medium voltage (MV), a high voltage (HV) or an extra high voltage (EHV) power cable, which terms are well known. EHV power cable operates at voltages which are even higher than typically used for HV power cable applications. LV power cable and in some embodiment medium voltage (MV) power cables usually comprise an electric conductor which is coated with an insulation layer. Typically MV and HV power cables comprise a conductor surrounded at least by an inner semiconductive layer, an insulation layer and an outer semiconductive layer, in that order.

Electrical Conductivity

In DC power cables the DC electrical conductivity is an important material property e.g. for insulating materials for high voltage direct current (HV DC) cables. First of all, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

JP2018811A discloses an insulation layer for a DC cable which contains a blend of 2-20 wt % of a high density polyethylene with a low density polyethylene. It is stated that blend provides improved DC breakdown and an impulse property. The blend is mixed with 2-3 wt % of a crosslinking agent. The type and layer structure of the cable has not been specified.

WO0137289 discloses a specific thermoplastic propylene homo- or copolymer for a cable layer material in LV, MV and HV AC cables, as well as in telecommunication cables. The applicability of the material to DC applications is not discussed.

There are high demands to increase the voltage of a power cable, and particularly of a direct current (DC) power cable, and thus a continuous need to find alternative polymer compositions with reduced conductivity. Such polymer compositions should preferably also have good mechanical properties required for demanding power cable embodiments.

The invention and further objects and benefits thereof are described and defined in details below.

FIGURES

DESCRIPTION OF THE INVENTION

Figure 1:
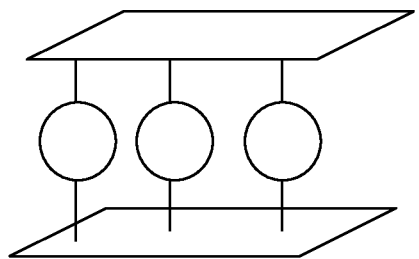
FIG. 1 is a schematic partial section of two lamellas and an interlayer in between to illustrate generally the lamellar structure of a preferable anion exchanger additive as the ion exchanger additive (b). The stable lamella layers are shown as continuous layers and the round shaped species illustrate the exchangeable anions of interlayers.

The present invention provides a use of a polymer composition comprising
(a) a polymer, and
(b) an ion exchanger additive; as defined above, below or in claims, for producing an electrical or communication device comprising said polymer composition, preferably for producing an insulation of an electrical or communication device. Such devices are e.g. cables, joints including termination joints in cable applications, capacitor films etc.

Unexpectedly, the polymer composition comprising (a) a polymer together with (b) an ion exchanger additive has advantageous electrical properties. Namely, the polymer composition of the invention has surprisingly reduced, i.e. low, electrical DC conductivity. "Reduced" or "low" electrical DC conductivity as used herein interchangeably means that the value obtained from the DC conductivity measurement as defined below under "Determination methods" is low, i.e. reduced. Without binding to any theory it is believed that the ion exchanger additive (b) captures the ionic species which worsen (increase) the electrical DC conductivity, for instance anionic species, such as chlorine, which can be present in the polymer (a).

Accordingly, the polymer composition is very desirable for electrical and communication applications, preferably for wire and cable applications, particularly for a power cable layers. Moreover, low electrical DC conductivity is beneficial for minimising the undesired heat formation in a cable layer, e.g. in an insulation layer of a power cable, especially in a DC power cable. Moreover and unexpectedly, the polymer composition has low electrical conductivity without being crosslinked with a crosslinking agent, such as peroxide. Further unexpectedly, the non-crosslinked polymer composition can still meet e.g. the mechanical properties desired for a layer, preferably an insulation layer, of a power cable, preferably a DC power cable.

Accordingly, the preferred use is for producing a cable selected from
(i) a cable (A) comprising a conductor surrounded by at least one layer comprising, preferably consisting of, said polymer composition which comprises
(a) a polymer, and
(b) an ion exchanger additive; as defined above, below or in claims;
or
(ii) a cable (B) comprising a conductor surrounded by an inner semiconductive layer, an insulating layer and an outer semiconductive layer, wherein at least the insulation layer comprises, preferably consists of, the polymer composition which comprises
(a) a polymer, and
(b) an ion exchanger additive; as defined above, below or in claims.

The polymer composition of the invention is referred herein below also shortly as "polymer composition". The polymer components thereof as defined above are also shortly referred herein as "polymer (a)", or "polyolefin (a)" as the preferred "polymer (a)", and, respectively, "ion exchanger additive (b)".

The polymer (a) is preferably a polyolefin (referred herein also as polyolefin (a)), more preferably a polyolefin produced in the presence of an olefin polymerization catalyst or a polyethylene produced by polymerisation in a high pressure process (HP) (referred herein also as low density polyethylene, LDPE).

"Polyolefin produced in the presence of an olefin polymerisation catalyst" is also often called as "low pressure polyolefin" to distinguish it clearly from LDPE. Both expressions are well known in the polyolefin field. Furthermore, "low density polyethylene", LDPE, is thus a polyethylene produced in a high pressure process (HP). Typically the polymerization of ethylene and optional further comonomer(s) in the high pressure process is carried out in the presence of an initiator(s). The meaning of LDPE polymer is well known and documented in the literature. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

For instance, polyolefins produced in the presence of an olefin polymerization catalyst typically contain catalyst residues, such as anionic species, typically halogens, often chlorine. Therefore acid scavengers have been added to the produced polyolefin to protect e.g. the processing equipment against corrosion caused by the undesirable residues, such as hydrochloric acid formed from chlorine based residues. In the prior art the conventionally used acid scavengers have been found to increase the electrical DC conductivity of the polymer which is highly undesirable for the power cable layer material and limits the use of the polyolefins produced by an olefin polymerization catalyst in the power cables operating in MV and particularly in HV levels, more particularly in the HV and EHV direct current (DC) cable applications. The ion exchanger additive (b) of the polymer composition of the invention captures the undesirable ionic catalyst residues effectively and lowers markedly the electrical DC conductivity of a polyolefin produced by an olefin polymerization catalyst. As a result, the use of conventional acid scavengers with undesirable effect on electrical DC conductivity can be avoided. The invention is thus very advantageous also for polyolefins, which have been produced by an olefin catalyst, and particularly for their use in cable applications.

Accordingly, in the preferred embodiment of the invention, the polymer (a) is more preferably a polyethylene produced (=polymerised) in the presence of an olefin polymerisation catalyst; or a homo- or copolymer of C3-20 alpha-olefin produced in the presence of an olefin polymerisation catalyst, which is then preferably a homo- or copolymers of polypropylene or a homo- or copolymers of butane. Most preferred polyolefin (a) is a polyethylene produced in the presence of an olefin polymerisation catalyst or polypropylene produced in the presence of an olefin polymerisation catalyst and even more preferably a polyethylene produced in the presence of an olefin polymerisation catalyst.

The preferred polyolefin (a) and the further properties and preferable embodiments thereof are further described later below.

As to the ion exchanger additive (b) of the polymer composition:

The ion exchanger additive (b) of the polymer composition of the invention can be added to the polymer composition as such, i.e. neat, or as an additive composition as supplied by additive producers, which may contain e.g. a carrier material, e.g. a carrier polymer, and optionally further additives. Moreover, such ion exchanger additive (b) or the additive composition thereof can be added to the polymer composition as such, e.g. as supplied by the additive producer, or in a further carrier material, e.g. in a polymer carrier, for instance in a so called master batch (MB). The amount of the ion exchanger additive (b) as given below and claims is the weight (amount) of said ion exchanger additive (b) as such, i.e. neat, based on the total weight (amount) (100 wt %) of the polymer composition.

The ion exchanger additive (b) of the polymer composition of the invention is preferably an inorganic ion exchanger additive, more preferably an inorganic anion exchanger additive. Furthermore preferably the anion exchanger additive (b) can exchange anions by halogens (i.e. capture halogens), preferably at least chlorine based species. Further preferably the ion exchanger additive (b) has a lamellar structure.

The preferred embodiment of the ion exchanger additive (b) is a lamellar anion exchanger, preferably a lamellar anion exchanger which comprises anionic interlayers. The preferable lamellar ion exchanger additive (b) comprises lamella layers which form the stable host lattice and the exchangeable anionic interlayers are between said lamellas. Anionic interlayers mean herein that the interlayers comprise anions which are weakly bonded to the lamella layers and exchangeable with the anionic species present in the polymer (a) of the polymer composition. FIG. 1 illustrates generally the lamellar structure (a schematic partial section showing two lamellas and an interlayer in between) of an anion exchanger additive as the preferable ion exchanger additive (b). In this preferred embodiment the interlayers of the lamellar anion exchanger (b) preferably comprise $CO_3^{2-}$ anions that are exchangeable with the anionic species present in the polymer composition, such as in polymer (a).

Moreover, in this preferred embodiment the stable lamellas comprise preferably cation species selected e.g. from any of Mg-, Al-, Fe-, Cr-, Cu-, Ni- or Mn-cations, or any mixtures thereof, more preferably at least from $Mg^{2+}$-cations, and more preferably from $Mg^{2+}$ and $Al^{3+}$-cations, based species.

In this preferred embodiment the most preferred ion exchanger additive (a) is a lamellar anion exchanger additive of hydrotalcite type, preferably a lamellar anion exchanger additive of a synthetic hydrotalcite type comprising anionic interlayers which comprise exchangeable $CO_3^{2-}$ anions, even more preferably a lamellar anion exchanger additive of synthetic hydrotalcite type having a general formula $Mg_x R_y^{(3+)}(OH)_z(CO_3)_k*nH_2O$, wherein $R^{(3+)}$=Al, Cr or Fe, preferably Al. In said general formula, preferably, x is between 4-6; y is 2; z is between 6-18, k is 1 and n is between 3-4. It is evident that the ratios can vary, depending e.g. of the amount of the crystal water etc. As a non-limiting example only a general formula $Mg_6 R_2^{(3+)}(OH)_{16} CO_3*4H_2O$, wherein $R^{(3+)}$=Al, Cr or Fe, preferably Al, can be mentioned.

Moreover in this preferred embodiment the ion exchanger additive (b), preferably the hydrotalcite as specified above, below or in claims, can be modified, for instance surface treated, as well known in the art.

The ion exchanger additives (b) suitable for the present invention are e.g. commercially available. Amongst the preferred ion exchanger additives (b), a commercially available synthetic hydrotalcite (IUPAC name: dialuminium hexamagnesium carbonate hexadecahydroxide, CAS no. 11097-59-9), can be mentioned, such as supplied by Kisuma Chemicals under the commercial name DHT-4V.

The amount of the polymer (a), preferably the polyolefin (a), in the polymer composition of the invention is typically of at least 50 wt %, preferably at least 60 wt %, more preferably at least 70 wt %, more preferably at least 75 wt %, more preferably from 80 to 100 wt % and more preferably from 85 to 100 wt %, of the total weight of the polymer component(s) present in the polymer composition. The preferred polymer composition consists of the polymer (a), preferably the polyolefin (a), as the only polymer component. The expression means that the polymer composition does not contain further polymer components, but the polymer (a), preferably the polyolefin (a), as the sole polymer component. However, it is to be understood herein that the polymer composition may comprise further components other than the polymer (a) and the ion exchanger additive (b), such as further additives which may, as the ion exchanger additive (b), optionally be added in a mixture with a carrier polymer, i.e. in so called master batch.

The amount of the ion exchanger additive (b), preferably the hydrotalcite as defined above, below or in claims, naturally depends on the desired end application (e.g. the desired conductivity level) and can be adapted by a skilled person. Preferably, the polymer composition comprises the ion exchanger additive (b), preferably the hydrotalcite, as defined above, below or in claims, as such, i.e. neat, in an amount of less than 1 wt %, preferably less than 0.8 wt %, preferably from 0.000001 to 0.7 wt %, preferably from 0.000005 to 0.6 wt %, more preferably from 0.000005 to 0.5 wt %, more preferably from 0.00001 to 0.1 wt %, more preferably from 0.00001 to 0.08 wt %, more preferably from 0.00005 to 0.07 wt %, more preferably from 0.0001 to 0.065 wt %, more preferably from 0.0001 to 0.06 wt %, more preferably from 0.0003 to 0.055 wt %, more preferably from 0.0005 to 0.05 wt %, more preferably from 0.001 to 0.05 wt %, more preferably from 0.0015 to 0.05 wt %, more preferably from 0.0020 to 0.05 wt %, more preferably from 0.0030 to 0.05 wt %, more preferably from 0.0035 to 0.05 wt %, more preferably from 0.0040 to 0.05 wt %, more preferably from 0.0045 to 0.05 wt %, more preferably from 0.005 to 0.05 wt %, based on the total weight of the polymer composition.

The polymer composition has preferably an electrical conductivity of 50 fS/m or less, more preferably of <0.01 (lower values not detectable by the DC conductivity measurement) to 40 fS/m, more preferably of <0.01 to 30 fS/m, more preferably of <0.01 to 20 fS/m, more preferably of <0.01 to 10 fS/m, more preferably of <0.01 to 8.00 fS/m, more preferably of <0.01 to 6.00 fS/m, more preferably of <0.01 to 5.00 fS/m, preferably of <0.01 to 4.00 fS/m, more preferably of <0.01 to 3.5 fS/m, more preferably of <0.01 to 3.0 fS/m, even more preferably of <0.01 to 2.5 fS/m, even more preferably of <0.01 to 2.0 fS/m, even more preferably of <0.01 to 1.0 fS/m, even more preferably of <0.01 to 0.5 fS/m when measured according to DC conductivity method as described under "Determination Methods".

The polymer composition can be crosslinked or non-crosslinked, preferably non-crosslinked.

Accordingly, in embodiments, wherein the polymer composition comprises no crosslinking agent, the electrical DC conductivity as described under the "Determination method" is measured from a sample of said polymer composition which is non-crosslinked (i.e. does not contain a crosslinking agent and has not been crosslinked with a crosslinking agent). In embodiments, wherein the polymer composition is crosslinkable and comprises a crosslinking agent, then the electrical conductivity is measured from a sample of the crosslinked polymer composition (i.e. a sample of the polymer composition is first crosslinked during the sample preparation using the crosslinking agent initially present is the polymer composition and then the electrical conductivity is measured from the obtained crosslinked sample). The conductivity measurement from a non-crosslinked or a crosslinked polymer composition sample is described under "Determination Methods". The amount of the crosslinking agent, if present, can vary, preferably within the ranges given below.

Herein "crosslinked" means that the at least the polymer (a) is crosslinked in the presence of a crosslinking agent which is added to the polymer composition for crosslinking purpose. "Without crosslinking", "not crosslinked" or "non-crosslinked" as used herein above, below or in claims means that no crosslinking agent is added to the polymer composition for crosslinking the composition (also known as thermoplast). Similarly, "comprises no crosslinking agent" means herein the polymer composition does not comprise any crosslinking agent which would have been added to crosslink the composition.

"Crosslinkable" means that the polymer composition can be crosslinked using a crosslinking agent(s) before the use in the end application thereof. Crosslinkable polymer composition further comprises a crosslinking agent. Moreover, if crosslinked, then the polymer composition or, respectively, the polymer (a), is most preferably crosslinked via radical reaction with a free radical generating agent. The crosslinked polymer composition has a typical network, i.e. interpolymer crosslinks (bridges), as well known in the field. As evident for a skilled person, the crosslinked polymer composition can be and is defined herein with features that are present in the polymer composition or polymer (a) before or after the crosslinking, as stated or evident from the context. For instance the amount of the crosslinking agent in the polymer composition or a compositional property, such as MFR, or density, of the polymer (a) are defined, unless otherwise stated, before crosslinking.

"Crosslinked" means that the crosslinking step provides a further technical feature to the crosslinked polymer composition (product by process) which makes a further difference over prior art.

Accordingly, if crosslinked, then the polymer (a) is most preferably a polyolefin (a) which is a LDPE polymer as defined above, below or in claims. Moreover, if crosslinked, then the polymer composition comprises a crosslinking agent, which is then preferably a peroxide in an amount of 0 to 110 mmol —O—O—/kg polymer composition, preferably 0 to 90 mmol —O—O—/kg polymer composition (corresponds 0 to 2.4 wt % of dicumyl peroxide based on the polymer composition), 0 to 75 mmol —O—O—/kg polymer composition.

The unit "mmol —O—O—/kg polymer composition" means herein the content (mmol) of peroxide functional groups per kg polymer composition, when measured from the polymer composition prior to crosslinking For instance the 35 mmol —O—O—/kg polymer composition corresponds to 0.95 wt % of the well known dicumyl peroxide based on the total amount (100 wt %) of the polymer composition.

Such polymer composition, if optionally crosslinked, may comprise one type of peroxide or two or more different types of peroxide, in which case the amount (in mmol) of —O—O—/kg polymer composition, as defined above, below or in claims, is the sum of the amount of —O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. Preferably, the peroxideis selected from 2,5-di(tert-butylperoxy)-2,5-dimethylhexane, di(tert-butylperoxyisopropyl)benzene, dicumylperoxide, tert-butylcumylperoxide, di(tert-butyl) peroxide, or mixtures thereof. Most preferably, the peroxide is dicumylperoxide.

However, as mentioned above, the electrical conductivity of a non-crosslinked polymer composition is surprisingly low.

Additionally, the polymer composition of the invention may contain, in addition to the polymer (a), the ion exchanger additive (b) and the optional peroxide, further component(s) such as polymer component(s) and/or additive(s), preferably additive(s), such as any of antioxidant(s), scorch retarder(s) (SR), crosslinking booster(s), stabiliser(s), processing aid(s), flame retardant additive(s), water tree retardant additive(s), further acid or ion scavenger(s), inorganic filler(s) and voltage stabilizer(s), as known in the polymer field. The polymer composition comprises preferably conventionally used additive(s) for W&C applications, such as one or more antioxidant(s) and optionally one or more scorch retarder(s), preferably at least one or more antioxidant(s). The used amounts of additives are conventional and well known to a skilled person.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

Most preferably the polymer composition is used in a cable, preferably in a power cable, more preferably in a DC power cable. Moreover, the polymer composition is very advantageous layer material for a DC power cable, which can be e.g. a low voltage (LV), a medium voltage (MV), a high voltage (HV) or an extra high voltage (EHV) DC cable, which terms, as well known, indicate the level of operating voltage. The polymer composition is even more preferable layer material for a DC power cable operating at voltages higher than 10 kV, such as a HV DC cable. For HV DC cables the operating voltage is defined herein as the electric voltage between ground and the conductor of the high voltage cable.

The invention further provides a cable which is selected from
(i) a cable (A) comprising a conductor surrounded by at least one layer comprising, preferably consisting of, the polymer composition which comprises
(a) a polymer, and
(b) an ion exchanger additive; as defined above, below or in claims;
or
(ii) a cable (B) comprising a conductor surrounded by an inner semiconductive layer, an insulating layer and an outer semiconductive layer, wherein at least the insulation layer comprises, preferably consists of, the polymer composition which comprises
(a) a polymer, and
(b) an ion exchanger additive; as defined above, below or in claims.

Preferably, the layer of said cable (A) or (B), as defined above, below or in claims, which comprises, preferably consists of the polymer composition of the invention, as defined above, below or in claims, is crosslinked or non-crosslinked, preferably non-crosslinked.

The most preferred cable of the invention is the cable (B), preferably a power cable (B), more preferably a DC power cable (B), as defined above, below or in claims. Even more preferably the polymer composition is used in a layer of a HV DC power cable (B) operating at voltages of 40 kV or higher, even at voltages of 50 kV or higher. More preferably, the polymer composition is used in a layer of a HV DC power cable (B) operating at voltages of 60 kV or higher. The invention is also highly feasible in very demanding cable applications and can be used in a layer of a HV DC power cable operating at voltages higher than 70 kV. The upper limit is not limited. The practical upper limit can be up to 900 kV. The invention is advantageous for use in HV DC power cable (B) applications operating from 75 to 400 kV, preferably 75 to 350 kV. The invention is also found to be advantageous even in demanding extra HV DC power cable (B) applications operating 400 to 850 kV.

HV DC power cable (B) as used below or in claims means herein either HV DC power cable (B), preferably operating at voltages as defined above, or extra HV DC power cable (B), preferably operating at voltages as defined above. Thus the term covers independently the operating areas for both the HV DC cable also EHV DC cable applications.

Further preferably at least the layer of the cable (B), preferably a power cable (B), more preferably a DC power cable (B), as defined above, below or in claims, which comprises, preferably consists of the polymer composition of the invention, as defined above, below or in claims, is non-crosslinked.

The cable of the invention and the further properties and preferable embodiments thereof, as well as the production process of the cable are further described later below.

Accordingly, the invention is also directed to a method for reducing, i.e. for providing a low, electrical conductivity of a polymer composition of a DC power cable (A) or (B), preferably a DC power cable (B), more preferably a HV DC power cable (B), by producing at least one layer, preferably an insulation layer using the polymer composition of the invention comprising
(a) a polymer, and
(b) an ion exchanger additive; as defined above, below or in claims.

Accordingly, in the most preferred embodiment the polymer composition is not crosslinked.

Thus it is preferred that the polymer composition comprises no crosslinking agent. In this embodiment the non-crosslinked polymer composition has very advantageous low electrical conductivity and need not to be crosslinked for use in a layer, preferably in an insulation layer, of a cable (A) or (B), preferably of a DC power cable (A) or (B), more preferably of a DC power cable (B), as defined above, below or in claims. In this embodiment the prior art drawbacks relating to the use of a crosslinking agent in cable layer can be avoided. Naturally, the embodiment enables to simplify the cable production process. The preferred non-crosslinked polymer composition is the polymer composition according to the second embodiment.

It is preferred that the polymer composition and the preferable subgroups thereof are used for producing an insulation layer of a cable (A) or (B), preferably of a DC power cable (A) or (B), more preferably of a DC power cable (B), more preferably of a HV DC power cable (B), as defined above, below or in claims. Preferably, the polymer composition is avoid of, i.e. does not comprise, a carbon black. Also preferably, the polymer composition is avoid of, does not comprise, flame retarding additive(s) in such amounts conventionally used for acting as "flame retardants", e.g. a metal hydroxide containing additives in flame retarding amounts.

The following preferable embodiments, properties and subgroups of the polymer (a) and the ion exchanger additive (b) components suitable for the polymer composition of the invention are independently generalisable so that they can be used in any order or combination to further define the preferable embodiments of the polymer composition and the cable produced using the polymer composition. Moreover, it is evident that the given polymer (a) description applies to the polymer prior optional crosslinking Polymer (a)

The polymer (a) is preferably a polyolefin (herein also shortly as polyolefin (a)), more preferably a polyolefin produced (=polymerised) in the presence of an olefin polymerization catalyst or a polyethylene produced by polymerisation in a high pressure process (referred herein also as low density polyethylene, LDPE).

A suitable preferable polyolefin (a) as the polymer (a) can be any polyolefin, such as any conventional polyolefin, which can be used in a cable layer, preferably in an insulating layer, of a cable.

Suitable polyolefins (a) are e.g. as such well known and can be e.g. commercially available or can be prepared according to or analogously to known polymerization processes described in the chemical literature.

If the polyolefin (a) is a LDPE, then the LDPE polymer may be a low density homopolymer of ethylene (referred herein as LDPE homopolymer) or a low density copolymer of ethylene with one or more comonomer(s) (referred herein as LDPE copolymer). The one or more comonomers of LDPE copolymer are preferably selected from the polar comonomer(s), non-polar comonomer(s) or from a mixture of the polar comonomer(s) and non-polar comonomer(s), as defined above or below. Moreover, said LDPE homopolymer or LDPE copolymer as said second polyolefin (b) may optionally be unsaturated.

As well known "comonomer" refers to copolymerisable comonomer units.

If the preferable polyolefin (a) is a LDPE copolymer, then it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s).

The LDPE polymer as the polyolefin (a) is preferably produced at high pressure by free radical initiated polymerisation (referred to as high pressure (HP) radical polymerization). The HP reactor can be e.g. a well known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

More preferably the polyolefin (a) is a "low pressure polyethylene", i.e. a polyethylene produced (=polymerised) in the presence of an olefin polymerisation catalyst; or a homo- or copolymer of C3-20 alpha-olefin produced in the presence of an olefin polymerisation catalyst, which is then preferably a homo- or copolymers of polypropylene or a homo- or copolymers of butane. Most preferred polyolefin (a) is a polyethylene produced in the presence of an olefin polymerisation catalyst or polypropylene produced in the presence of an olefin polymerisation catalyst, and even more preferably a polyethylene produced in the presence of an olefin polymerisation catalyst.

"Olefin polymerisation catalyst" means herein a conventional coordination catalyst. It is preferably selected from a Ziegler-Natta catalyst, single site catalyst which term comprises a metallocene and a non-metallocene catalyst, or a chromium catalyst, or any mixture thereof.

Term "Polyethylene" (PE) means homopolymer of ethylene or a copolymer of ethylene with one or more comonomer(s). "Polypropylene" (PP) means propylene homopolymer, a random copolymer of propylene with one or more comonomer(s) or heterophasic copolymer of propylene with one or more comonomer(s).

Low pressure PE or PP can be unimodal or multimodal with respect to molecular weight distribution (MWD=$M_w/M_n$). Generally, a polymer comprising at least two polymer fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The term "multimodal" means herein, unless otherwise stated, multimodality at least with respect to molecular weight distribution (MWD=Mw/Mn) and includes also bimodal polymer.

A multimodal low pressure PE or PP usable in the present invention comprises a lower weight average molecular weight (LMW) component (A) and a higher weight average molecular weight (HMW) component (B). Said LMW component has a lower molecular weight than the HMW component.

Naturally, the multimodal low pressure PE or PP may in addition or alternatively to multimodality with respect to MWD be multimodal with respect to density and comonomer content. I.e. the LMW and HMW components may have different comonomer content or density, or both.

Preferably the low pressure PE and PP independently have a MWD of at least 2.0, preferably of at least 2.5, preferably of at least 2.9, preferably from 3 to 30, more preferably from 3.3 to 25, even more preferably from 3.5 to 20, preferably 3.5 to 15. A unimodal PE or PP has typically a MWD of 3.0 to 10.0.

The low pressure PE or PP can be a copolymer of ethylene or, respectively, of propylene (random or heterophasic), with one or more comonomer(s). Comonomer as used herein means monomer units other than ethylene or, respectively propylene, which are copolymerisable with ethylene or, respectively with propylene. In "random copolymer" the comonomer(s) in said copolymer is distributed randomly, i.e. by statistical insertion of the comonomer units, within the copolymer chain. Said "heterophasic copolymer of propylene" comprises a matrix phase which can be a propylene homopolymer or a propylene copolymer, and an elastomeric phase of propylene copolymer, also known as rubber part, which is dispersed in said matrix phase.

Preferably, the low pressure PE or PP copolymer, if used as the polyolefin (a), can typically be a binary copolymer, i.e. e.g. the PE copolymer contains ethylene and one comonomer, or a terpolymer, i.e. e.g. the PE copolymer contains ethylene and two or three comonomers.

It is preferred that the polyolefin (a) is a low pressure PE homopolymer or copolymer. The low pressure PE copolymer, if used as the polyolefin (a), is preferably a copolymer of ethylene with one or more olefin comonomer(s), preferably with at least C3-20 alpha olefin, more preferably with at least one C4-12 alpha-olefin, more preferably with at least one C4-8 alpha-olefin, e.g. with 1-butene, 1-hexene or 1-octene. The amount of comonomer(s) present in a PE copolymer is from 0.1 to 15 mol %, typically 0.25 to 10 mol-%.

In one preferable embodiment the polyolefin (a) is a low pressure PE selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein PEs which are also known as plastomers and elastomers and covers the density range of from 850 to 909 $kg/m^3$. The LLDPE has a density of from 909 to 930 $kg/m^3$, preferably of from 910 to 929 $kg/m^3$, more preferably of from 915 to 929 $kg/m^3$. The MDPE has a density of from 930 to 945 $kg/m^3$, preferably 931 to 945 $kg/m^3$ The HDPE has a density of more than 945 $kg/m^3$, preferably of more than 946 $kg/m^3$, preferably form 946 to 977 $kg/m^3$, more preferably form 946 to 965 $kg/m^3$.

LLDPE, MDPE or HDPE are preferable types of low pressure PE for use as the polyolefin (a) of the present invention. Such LLDPE, MDPE or HDPE can be unimodal or multimodal. The multimodality contributes to the mechanical and processing properties, such as thermal stress cracking (TSCR).

Most preferred polyolefin (a) as the polymer (a) of the polymer composition of the invention is a unimodal or multimodal HDPE or a unimodal or multimodal MDPE polymer, preferably a HDPE homopolymer which can be unimodal or multimodal.

The low pressure PE has preferably an $MFR_2$ of up to 1200 g/10 min, such as of up to 1000 g/10 min, preferably of up to 500 g/10 min, preferably of up to 400 g/10 min, preferably of up to 300 g/10 min, preferably of up to 200 g/10 min, preferably of up to 150 g/10 min, preferably from 0.01 to 100, preferably from 0.01 to 50 g/10 min, preferably from 0.01 to 40.0 g/10 min, preferably of from 0.05 to 30.0 g/10 min, preferably of from 0.1 to 20.0 g/10 min, more preferably of from 0.2 to 15.0 g/10 min.

Suitable low pressure PE and PP as the polyolefin (a) are as such well known and can be e.g. commercially available or, alternatively, can be produced according to or analogously to conventional polymerisation processes which are well documented in the literature.

The olefin polymerisation catalyst can be selected from well known coordination catalysts, preferably from Ziegler Natta, single site, which term comprises well known metallocene and non-metallocene catalyst, or Chromium catalyst, or any mixtures thereof. It is evident for a skilled person that the catalyst system comprises a co-catalyst. Suitable Ziegler Natta catalysts for low pressure PE are described e.g. in EP0810235 or EP0688794 which are all incorporated by reference herein. Suitable Ziegler Natta catalysts for PP are described e.g. in WO03000754 or EP 1 484 345, which are all incorporated by reference herein. As known PP catalysts typically may contain internal or external donors. As well known the catalytically active catalyst component(s), such as the catalytically active component of the Ziegler Natta catalyst, is normally combined with an activator. Moreover the catalyst system can be non-supported or supported on a carrier, such as external carrier, like silica-based or Mg-based carrier.

The unimodal low pressure PE and PP, preferably PE, can be produced by a single stage polymerisation in a single reactor in a well known and documented manner. The multimodal (e.g. bimodal) low pressure PE or PP, preferably PE, can be produced e.g. by blending mechanically together two or more separate polymer components or, preferably, by in-situ blending during the polymerisation process of the components. Both mechanical and in-situ blending are well known in the field. Accordingly, the preferable in-situ blending means the polymerisation of the polymer components under different polymerisation conditions, e.g. in a multistage, i.e. two or more stage, polymerization or by the use of two or more different polymerization catalysts, including multi- or dual site catalysts, in a one stage polymerization, or by use a combination of multistage polymerisation and two or more different polymerisation catalysts. In the multistage polymerisation process the polymer is polymerised in a process comprising at least two polymerisation stages. Each polymerisation stage may be conducted in at least two distinct polymerisation zones in one reactor or in at least two separate reactors. Preferably, the multistage polymerisation process is conducted in at least two cascaded polymerisation zones. Polymerisation zones may be connected in parallel, or preferably the polymerisation zones operate in cascaded mode. The polymerisation zones may operate in bulk, slurry, solution, or gas phase conditions or in any combinations thereof. In the preferred multistage process a first polymerisation step is carried out in at least one slurry, e.g. loop, reactor and the second polymerisation step in one or more gas phase reactors. One preferable multistage process is described in EP517868. For suitable polypropylenes as said polyolefin (a) the preparation processes thereof, reference is also made to e.g. Nello Pasquini (Ed.) Polypropylene Handbook, Hanser, Munich, 2005, pages 15-141.

In general, the temperature in the low pressure PE and PP polymerisation is typically from 50 to 115° C., preferably from 60 to 110° C. The pressure is from 1 to 150 bar, preferably from 10 to 100 bar. The precise control of polymerisation conditions can be performed by using different types of catalyst and using different comonomer and/or hydrogen feeds.

Prepolymerisation may precede the actual polymerisation step(s), as well known in the field.

In case of heterophasic copolymer of propylene the matrix of propylene homopolymer or random copolymer can be produced e.g. in a single stage or as a multistage process described above and the elastomeric (rubber) part of the propylene copolymer can be produced as an in-situ polymerisation e.g. in a separate reactor, e.g. gas phase reactor in the presence of the matrix polymer produced in the previous stage. Alternatively the elastomeric copolymer of propylene part can be mechanically compounded to the matrix phase material, as well known in the art.

The obtained low pressure PE or PP, preferably PE, polymerisation product may be compounded in a known manner and optionally with additive(s) and pelletised for further use.

End Uses and End Applications of the Polymer Composition of the Invention

The polymer composition of the invention is most preferably used for producing a layer of a cable, preferably of a power cable, more preferably of a direct current (DC) power cable, as defined above, below or in claims.

The invention thus further provides a cable, preferably of a direct current (DC) power cable, which is selected from
(i) a cable (A) comprising a conductor surrounded by at least one layer comprising, preferably consisting of, the polymer composition which comprises
(a) a polymer, and
(b) an ion exchanger additive; as defined above, below or in claims; or
(ii) a cable (B) comprising a conductor surrounded by an inner semiconductive layer, an insulating layer and an outer semiconductive layer, wherein at least the insulation layer comprises, preferably consists of, the polymer composition which comprises
(a) a polymer, and
(b) an ion exchanger additive; as defined above, below or in claims.

Preferably, the cable (A) is a power cable (A), more preferably a DC power cable (A), and the at least one layer of the cable (A) is an insulation layer.

The layer of said cable (A) or cable (B), as defined above, below or in claims, which comprises, preferably consists of the polymer composition of the invention, as defined above, below or in claims, is crosslinked or non-crosslinked. More preferably, the cable is
(i) a cable (A) which is optionally crosslinkable, whereby the at least one layer is non-crosslinked; more preferably, the cable is
(ii) a cable (B) which is optionally crosslinkable, whereby at least the insulation layer is non-crosslinked.

The preferred cable is the cable (B), preferably a power cable (B), more preferably a DC power cable (B), even more preferably a HV direct current (DC) power cable (B); as defined above, below or in claims.

Accordingly, the inner semiconductive layer of the power cable comprises, preferably consists of, a first semiconductive composition, the insulation layer comprises, preferably consists of, an insulation composition, and the outer semiconductive layer comprises, preferably consists of, a second semiconductive composition. Thus one of the compositions, preferably at least the insulation composition comprises, more preferably, consists of, the polymer composition of the invention.

The first and the second semiconductive compositions can be different or identical and comprise a polymer(s) which is preferably a polyolefin or a mixture of polyolefins and a conductive filler, preferably carbon black. Suitable polyolefin(s) are e.g. polyethylene produced in a low pressure process or a polyethylene produced in a HP process (LDPE). The general polymer description as given above in relation to the polymer (a), preferably to the polyolefin (a), applies also for the suitable polymers for semiconductive layers. The carbon black can be any conventional carbon black used in the semiconductive layers of a DC power cable, preferably in the semiconductive layer of a DC power cable. Preferably the carbon black has one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, preferably furnace carbon black and acetylene carbon black. Preferably, the first and the second semiconductive polymer composition comprises 10 to 50 wt % carbon black, based on the weight of the Semiconductive composition.

Accordingly, the most preferable embodiment of the cable of the invention is the HV DC cable (B) the inner semiconductive layer comprises a first semiconductive composition, the insulation layer comprises an insulation composition and an outer semiconductive layer comprises a second semiconductive composition, in that order, and wherein the insulation composition of the insulation layer comprises, preferably consists, of said polymer composition comprising (a) a polymer, preferably a polyolefin (a), more preferably a low pressure polyethylene,
and
(b) an ion exchanger additive; as defined above, below or in claims.

In this embodiment it is preferred that at least the insulation composition of the insulation layer comprises, preferably consists, of said polymer composition comprising
(a) a polymer, preferably a polyolefin (a), more preferably a low pressure polyethylene,
and
(b) an ion exchanger additive; as defined above, below or in claims, which is non-crosslinked. Further preferably in this embodiment the inner semiconductive layer comprises, preferably consists of, a non-crosslinked first semiconductive composition. Furthermore in this embodiment the outer semiconductive layer comprises, preferably consists of, a non-crosslinked or a crosslinked second semiconductive composition. More preferably in this embodiment the insulation layer comprises, preferably consists of, the polymer composition of the invention which comprises a non-crosslinked polymer (a), preferably a non-crosslinked polyolefin (a), more preferably a non-crosslinked low pressure polyethylene, as defined above or in claims, and the ion exchanger additive (b) as defined above, below or in claims. It is further preferred in this embodiment that the first semiconductive composition of the inner semiconductive layer is non-crosslinked, the insulation layer comprises, preferably consists of the polymer composition of the invention comprising the low pressure polyethylene as the polyolefin (a), as defined above or in claims, which is non-crosslinked and the ion exchanger additive (b) as defined above, below or in claims. Furthermore, preferably, in this embodiment the outer semiconductive layer comprises, preferably consists of, a non-crosslinked or crosslinked second semiconductive composition, depending on the desired end application, preferably a or crosslinked second semiconductive composition.

As already mentioned, the expressions "without crosslinking", "not crosslinked" or "non-crosslinked", as used herein above and below, mean that no crosslinking agent is added to the polymer composition for the purpose of crosslinking the composition. Similarly, the expression "no crosslinking agent" means herein that the polymer composition does not comprise any crosslinking agent which had been added to the polymer composition for the purpose of crosslinking the polymer composition. E.g. a non-crosslinked polyolefin (a) comprises no crosslinking agent.

Naturally, the further preferable subgroups of the above properties, further properties, variants and embodiments as defined above or below for the polymer composition or for the polymer (a), preferably for the polyolefin (a), more preferably for the low pressure polyethylene, and the ion exchanger additive (b) components thereof apply similarly to the cable (A) and (B), preferably to the DC power cable (B), more preferably to the HV DC power cable (B), of the invention.

The term "conductor" means herein above and below that the conductor comprises one or more wires. Moreover, the cable may comprise one or more such conductors. Preferably the conductor is an electrical conductor and comprises one or more metal wires.

As well known the cable of the invention can optionally comprise further layers, e.g. layers surrounding the insulation layer or, if present, the outer semiconductive layers, such as screen(s), a jacketing layer(s), other protective layer(s) or any combinations thereof.

The invention also provides a process for producing a cable selected from
(i) a process for producing a cable (A), wherein the process comprises the steps of
applying on a conductor, preferably by (co)extrusion, at least one layer which comprises, preferably consists of, a polymer composition comprising
(a) a polymer, preferably a polyolefin (a), more preferably a polyethylene produced in the presence of an olefin polymerisation catalyst, and
(b) an ion exchanger additive; as defined above, below or in claims, and
optionally crosslinking said at least one layer of the obtained cable (A) in the presence of a crosslinking agent and at crosslinking conditions, preferably without crosslinking said polymer composition of said at least one layer of the obtained cable (A); or
(ii) a process for producing a cable (B), preferably a power cable (B), more preferably a DC power cable (B), even more preferably a HV DC power cable (B), wherein the process comprises the steps of
applying on a conductor, preferably by (co)extrusion, an inner semiconductive layer comprising a first semiconductive composition, an insulation layer comprising an insulation composition and an outer semiconductive layer comprising a second semiconductive composition, in that order, wherein the composition of at least one layer, preferably the insulation composition of the insulation layer, comprises, preferably consists of, a polymer composition comprising
(a) a polymer, preferably a polyolefin (a), more preferably a polyethylene produced in the presence of an olefin polymerisation catalyst, and
(b) an ion exchanger additive; as defined above, below or in claims;
and
optionally crosslinking the polymer composition of one or more layers of the obtained cable in the presence of a crosslinking agent and at crosslinking conditions, preferably without crosslinking at least the polymer composition of the obtained layer, comprising, preferably consisting of, the polymer composition comprising
(a) a polymer, preferably a polyolefin (a), more preferably a polyethylene produced in the presence of an olefin polymerisation catalyst, and
(b) an ion exchanger additive; as defined above, below or in claims, more preferably without crosslinking at least the insulation composition of the obtained insulation layer which preferably comprises, more preferably consists of, the polymer composition comprising
(a) a polymer, preferably a polyolefin (a), more preferably a polyethylene produced in the presence of an olefin polymerisation catalyst, and
(b) an ion exchanger additive; as defined above, below or in claims.

Most preferred process is for producing a HV DC cable (B), wherein the process comprises the steps of
applying on a conductor, preferably by (co)extrusion, an inner semiconductive layer comprising a first semiconductive composition, an insulation layer comprising, preferably consisting of, a polymer composition comprising
(a) a polymer, preferably a polyolefin (a), more preferably a polyethylene produced in the presence of an olefin polymerisation catalyst, and (b) an ion exchanger additive; as defined above, below or in claims, and an outer semiconductive layer comprising a second semiconductive composition, in that order; and optionally crosslinking one or both of the first semiconductive composition of the inner semiconductive layer and the second semiconductive composition of the outer semiconductive layer without crosslinking said insulation composition of the insulation layer, preferably without crosslinking at least the first semiconductive composition of the inner semiconductive layer and said insulation composition of the insulation layer. Further preferably the second semiconductive composition of the outer semiconductive layer is non-crosslinked or crosslinked, more preferably crosslinked, without crosslinking the polymer composition of the invention of the insulation layer. Also preferably, the first semiconductive composition of the inner semiconductive layer is not crosslinked.

More preferably, an optionally crosslinkable cable, preferably a power cable, preferably a power cable, more preferably a DC power cable (B), even more preferably a HV DC power cable (B), is produced, wherein the process comprises the steps of (a)
providing and mixing, preferably meltmixing in an extruder, an optionally crosslinkable first semiconductive composition comprising a polymer, a carbon black and optionally further component(s) for the inner semiconductive layer, providing and mixing, preferably meltmixing in an extruder, optionally crosslinkable polymer composition of the invention, comprising (a) a polymer, preferably a polyolefin (a), more preferably a low pressure polyethylene,
and
(b) an ion exchanger additive; as defined above, below or in claims, for the insulation layer, providing and mixing, preferably meltmixing in an extruder, a second semiconductive composition which is optionally crosslinkable and comprises a polymer, a carbon black and optionally further component(s) for the outer semiconductive layer, (b) applying on a conductor, preferably by coextrusion,
a meltmix of the first semiconductive composition obtained from step (a) to form the inner semiconductive layer,
a meltmix of polymer composition of the invention obtained from step (a) to form the insulation layer, and
a meltmix of the second semiconductive composition obtained from step (a) to form the outer semiconductive layer, and (c) optionally crosslinking at crosslinking conditions one or both of the first semiconductive composition of the inner semiconductive layer and the second semiconductive composition of the outer semiconductive layer, of the obtained cable, and optionally crosslinking the polymer composition of the insulation layer, more preferably at least without crosslinking the polymer composition of the insulation layer. Preferably in step (c) the second semiconductive polymer composition of the outer semiconductive layer is non-crosslinked or crosslinked, more preferably crosslinked without crosslinking the polymer composition of the insulation layer. Also preferably, in step (c) the second semiconductive polymer composition of the outer semiconductive layer is non-crosslinked or crosslinked, more preferably crosslinked without crosslinking the polymer composition of the insulation layer and the first semiconductive composition of the inner semiconductive layer.

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads.

As well known a meltmix of the polymer composition or component(s) thereof, is applied to form a layer. Meltmixing means mixing above the melting point of at least the major polymer component(s) of the obtained mixture and is carried out for example, without limiting to, in a temperature of at least 10-15° C. above the melting or softening point of polymer component(s). The mixing step (a) can be carried out in the cable extruder. The meltmixing step may comprise a separate mixing step in a separate mixer, e.g. kneader, arranged in connection and preceding the cable extruder of the cable production line. Mixing in the preceding separate mixer can be carried out by mixing with or without external heating (heating with an external source) of the component(s).

As well known, the polymer composition of the invention and the optional and preferred first and second semiconductive compositions can be produced before or during the cable production process. Moreover the polymer composition of the invention and the optional and preferred first and second semiconductive composition can each independently comprise part or all of the component(s) of the final composition, before introducing to the (melt)mixing step a) of the cable production process.

Preferably, the polymer composition of the invention and, optionally, the optional first and second semiconductive composition are provided to the cable production process in form of powder, grain or pellets. Pellets mean herein generally any polymer product which is formed from reactor-made polymer (obtained directly from the reactor) by post-reactor modification to a solid polymer particles. A well-known post-reactor modification is pelletising a meltmix of a polymer product and optional additive(s) in a pelletising equipment to solid pellets. Pellets can be of any size and shape. Moreover, the polymer (a), preferably the polyolefin (a), more preferably the low pressure polyethylene, and the ion exchanger additive (b) can be combined in a same powder, grain or pellet product, which thus contains a solid polymer mixture of the polymer (a), preferably the polyolefin (a), more preferably the low pressure polyethylene, and the ion exchanger additive (b). Alternatively, the polymer (a), preferably the polyolefin (a), more preferably the low pressure polyethylene, and the ion exchanger additive (b), as defined above, below or in claims, are provided separately and combined during the cable production process.

Preferably, the polymer (a), preferably the polyolefin (a), more preferably the low pressure polyethylene, and the ion exchanger additive (b) of the polymer composition can be premixed, e.g. meltmixed together and pelletised, before providing to the mixing step (a).

The polymer composition comprising the polymer (a), preferably the polyolefin (a), more preferably the low pressure polyethylene, and the ion exchanger additive (b), as defined above, below or in claims, may also comprise optional further component(s), such as peroxide or further additive(s). In case of the optional further component(s), such as peroxide or further additive(s), of the polymer composition of the invention and, respectively, part or all of the component(s) of the first or second semiconductive compositions, are added to the polyolefin during the cable production process, then the addition(s) can take place at any stage during the mixing step (a), e.g at the optional separate mixer preceding the cable extruder or at any point(s) of the cable extruder. The addition of the optional peroxide and optional additive(s) can be made simultaneously or separately as such, preferably in liquid form, or in a well known master batch, and at any stage during the mixing step (a).

It is preferred that the meltmix of the polymer composition obtained from (melt)mixing step (a) consists of the polymer (a), preferably the polyolefin (a), more preferably the low pressure polyethylene, of the invention as the sole polymer component(s). The optional and preferable additive(s) can be added to polymer composition as such or as a mixture with a carrier polymer, i.e. in a form of so-called master batch.

If an crosslinkable DC power cable (B) is produced, wherein the insulation layer comprises, preferably consists of, a polymer composition of the invention, as defined above, below or in claims. Preferably the insulation layer is not crosslinked and comprises no crosslinking agent. Then either one or both of the inner or outer semiconductive layers can be crosslinked.

The optional crosslinking agent(s) can already be present in the optional first and second semiconductive composition before introducing to the crosslinking step c) or introduced during the crosslinking step.

The optional crosslinking can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The invention further provides an optionally crosslinked DC power cable (B), preferably a crosslinked HV DC power cable, comprising a conductor surrounded by one or more layers, preferably at least by an insulation layer, more preferably at least by an inner semiconductive layer, insulation layer and an outer semiconductive layer, in that order, wherein at least the insulation layer comprises a non-crosslinked polymer composition of the invention as defined above or in claims, and wherein one or both of the inner semiconductive composition and the outer semiconductive composition are optionally crosslinked. Preferably, the second semiconductive polymer composition of the outer semiconductive layer is non-crosslinked or crosslinked, depending on the desired end application, preferably crosslinked, and the polymer composition of the invention is non-crosslinked. More preferably the first semiconductive composition of the inner semiconductive layer is non-crosslinked.

The preferred DC power cable of the invention is a HV DC power cable (B), as defined above, below or in claims. Preferably the HV DC power cable operates at voltages as defined above for HV DC cable or extra HV DC cable, depending on the desired end cable application.

The thickness of the insulation layer of the DC power cable (B), more preferably of the HV DC power cable (B), is typically 2 mm or more, preferably at least 3 mm, preferably of at least 5 to 100 mm, more preferably from 5 to 50 mm, and conventionally 5 to 40 mm, e.g. 5 to 35 mm, when measured from a cross section of the insulation layer of the cable. The thickness of the inner and outer semiconductive layers is typically less than that of the insulation layer, and in HV DC power cables (B) can be e.g. more than 0.1 mm, such as from 0.3 up to 20 mm, 0.3 to 10 of inner semiconductive and outer semiconductive layer. The thickness of the inner semiconductive layer is preferably 0.3-5.0 mm, preferably 0.5-3.0 mm, preferably 0.8-2.0 mm. The thickness of the outer semiconductive layer is preferably from 0.3 to 10 mm, such as 0.3 to 5 mm, preferably 0.5 to 3.0 mm, preferably 0.8-3.0 mm. It is evident for and within the skills of a skilled person that the thickness of the layers of the DC cable (B) depends on the intended voltage level of the end application cable and can be chosen accordingly.

Determination Methods

Unless otherwise stated in the description or experimental part the following methods were used for the property determinations.

Wt %: % by Weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4: 2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents a) Comonomer content in random copolymer of polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy. The calibration procedure based on results obtained from quantitative $^{13}C$—NMR spectroscopy was undertaken in the conventional manner well documented in the literature. The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (as in heterophasic PP copolymer) (720 cm$^{-1}$). The absorbance at 4324 cm$^{-1}$ was used as a reference band.

b) Quantification of alpha-olefin content in linear low density polyethylenes and low density polyethylenes by NMR spectroscopy:

The comonomer content was determined by quantitative 13C nuclear magnetic resonance (NMR) spectroscopy after basic assignment (J. Randall JMS—Rev. Macromol. Chem. Phys., C29 (2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer content of polar comonomers in low density polyethylene (1) Polymers Containing >6 Wt % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 Wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and (A2660–A1850) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains $0.20/M_{butylacrylate}$ (128 g/mol)=$1.56 \times 10^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g. The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2. The sample preparation was executed according to ISO 1872-2 Table 3 Q (compression moulding).

Low pressure process polyethylene: Density of the polymer was measured according to ISO 1183/1872-2B.

DC Conductivity Method

Electrical conductivity measured at 70° C. and 30 kV/mm mean electric field from a non-degassed or degassed, 1 mm plaque sample consisting of a polymer composition.

Plaque Sample Preparation:

The plaques are compression moulded from pellets of the test polymer composition. The final plaques have a thickness of 1 mm and 200×200 mm.

The plaques are press-moulded at 130° C. for 12 min while the pressure is gradually increased from 2 to 20 MPa. Thereafter the temperature is increased and reaches 180° C. after 5 min. The temperature is then kept constant at 180° C. for 15 min. Finally the temperature is decreased using the cooling rate 15° C./min until room temperature is reached when the pressure is released. The plaques are immediately after the pressure release controlled for thickness variations and thereafter mounted in the test cell for conductivity measurement, in order to prevent loss of volatile substances (used for the non-degassed determination).

If the plaque is to be degassed it is placed in a ventilated oven at atmospheric pressure for 24 h at 70° C. Thereafter the plaque is again wrapped in metallic foil in order to prevent further exchange of volatile substances between the plaque and the surrounding.

Figure 2:
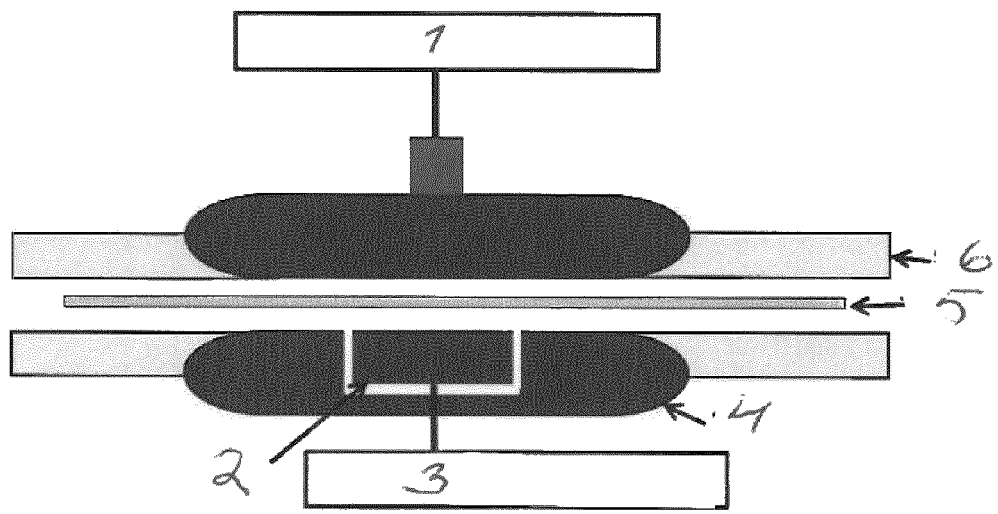
FIG. 2 shows a schematic picture of the measurement setup used in the DC conductivity method as described under "Determination methods". Explanation of the numbered parts "1-6": "1" Connection to high voltage; "2" Measuring electrode; "3" Electrometer/Pico Ammeter; "4" Brass electrode; "5" Test sample; "6" Si-rubber.

Measurement Procedure:

A high voltage source is connected to the upper electrode, to apply voltage over the test sample. The resulting current through the sample is measured with an electrometer or Pico-ammeter. The measurement cell is a three electrodes system with brass electrodes. The brass electrodes are placed in an oven to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes. The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation. A schematic picture of the measurement setup is shown in FIG. 2. Explanation of the numbered parts "1-6": "1" Connection to high voltage; "2" Measuring electrode; "3" Electrometer/Pico Ammeter; "4" Brass electrode; "5" Test sample; "6" Si-rubber.

Experimental part

Components of the Polymer compositions of the invention

HDPE: A conventional unimodal high density polyethylene produced in a gas phase reactor (low pressure HDPE) using a conventional ZN catalyst. Density 963 kg/m³, $MFR_2$ of 8 g/10 min.

Ion exchanger additive (b): synthetic hydrotalcite (IUPAC name: dialuminium hexamagnesium carbonate hexadecahydroxide, CAS no. 11097-59-9) supplied by Kisuma Chemicals under the commercial name DHT-4V Antioxidant (AO): Iranox B561 is a commercially available antioxidant blend that consists of 20% Irganox 1010 (CAS no. 6683-19-8) and 80% Irgafos 168 (CAS no. 31570-04-4).

Components of the Reference Compositions of the Invention:

HDPE: A conventional unimodal high density polyethylene produced in a gas phase reactor (low pressure HDPE) using a conventional ZN catalyst. Density 963 kg/m³, $MFR_2$ of 8 g/10 min.

Acid scavenger (CaSt): Calsium stearate CAS no. 1592-23-0, commercially available Acid scavenger (ZnSt): Zink stearate CAS no. 557-05-1, commercially available Antioxidant (AO):): Iranox B561 is a commercially available antioxidant blend that consists of 20 wt % Irganox 1010 (CAS no. 6683-19-8) and 80 wt % Irgafos 168 (CAS no. 31570-04-4).

Compounding of the Compositions:

Polymer pellets were added to a pilot scale extruder (Prism TSE 24TC) together with additives. The obtained mixture was meltmixed in conditions given in the below table and extruded to pellets in a conventional manner.

| Set Values Temperatures [° C.] | | | | | | | Extruder | | |
|---|---|---|---|---|---|---|---|---|---|
| Zone 1 | Zone 2 | Zone 3 | Zone 4 | Zone 5 | Zone 6 | rpm | Output [kg/h] | Pressure [bar] | Filter [mesh] |
| 110 | 140 | 150 | 150 | 150 | 150 | 178 | 4.3 | 12 | 200 |

TABLE 1

The components of the polymer compositions of the invention and the reference compositions, as well as the conductivity measurements

| | Comparative Example 1 | Comparative Example 2 | Inventive Example 1 | Inventive Example 2 |
|---|---|---|---|---|
| HDPE* [wt %] | 100 | 100 | 100 | 100 |
| AO** [wt %] | 0.095 | 0.095 | 0.095 | 0.095 |
| ZnSt**[wt %] | 0.075 | 0 | 0 | 0 |
| CaSt**[wt %] | 0 | 0.075 | 0 | 0 |
| ion exchanger additive (c)** [wt %] | 0 | 0 | 0.02 | 0.04 |
| Conductivity [fS/m] | 116 | 6.7 | 0.02 | <0.01*** |

*The wt % amounts of polymer component in table are based on the combined amount of used polymer component(s). The amount 100 wt % of polymer component in table 1 means that the polymer is the sole polymer component present in the test composition.
**The wt % amounts of ion exchanger additive (c), acid scavanger and AO are based on the final composition.
***Lower values not detectable by the DC conductivity measurement according to the method as given under "Determination methods".

Preparation of the Cable:

The polymer composition of the invention was used to produce an insulation layer of a power cable.

Power Cable Extrusion. A cable with three layers was made using a commercial semiconductive composition as inner and outer layer. The middle insulation layer was formed of the polymer composition of the invention. The construction of the cable was 50 mm² stranded Al-conductor and 5.5 mm thick insulation. The inner and outer semiconductive layers had a thickness of 1 mm and 1 mm, respectively. The cable line was a catenary Nokia Maillefer 1+2 system, thus one extrusion head for the inner conducting layer and another for the insulation+outer semiconductive layer.

The non-crosslinked cable was cooled in water.

If the cable was crosslinked, then crosslinking was carried out in the vulcanization tube under nitrogen and afterwards cooled in water.

The obtained cable has a low conductivity and shows the applicability of the polymer composition of the invention as a cable layer, preferably as an insulation layer, in power cable, e.g. of a HV DC power cable applications.

We claim:

1. A DC power cable comprising a conductor surrounded by an inner semiconductive layer, an insulating layer and an outer semiconductive layer, in that order, wherein at least the insulation layer comprises a non-crosslinked polymer composition having an electrical conductivity of <0.01 to 6.00 fS/m which comprises:
   (a) a non-crosslinked ethylene homopolymer or copolymer of ethylene with one or more comonomer(s) C3-C20 alpha-olefin produced in the presence of an olefin polymerisation catalyst, wherein the amount of comonomer(s) in the copolymer of ethylene is from 0.1 to 15 mol %; and
   (b) an inorganic anion exchanger additive of hydrotalcite type;
   wherein polymer (a) is the only polyolefinic component present in the polymer composition; and wherein the insulation layer comprises the ion exchanger additive (b) in an amount of 0.0005 to 0.05 wt % based on the total weight of the insulation layer.

2. The DC power cable according to claim 1, which is a HV DC power cable.

3. The DC power cable according to claim 1, wherein the polyolefin (a) is a polyethylene (a) produced in the presence of an olefin polymerisation catalyst or a polyethylene produced in a high pressure process (LDPE).

4. The DC power cable according to claim 1 wherein the polyolefin (a) is an ethylene homopolymer or a copolymer of ethylene with one or more comonomer(s) C3-20 alpha-olefin produced in the presence of an olefin polymerisation catalyst.

5. The DC power cable according to claim 1, wherein the polyolefin (a) is a polyolefin (a) which is a polyethylene produced in the presence of an olefin polymerisation catalyst and selected from very low density polyethylene (VLDPE) copolymers, linear low density polyethylene (LLDPE) copolymers, medium density polyethylene (MDPE) copolymers or high density polyethylene (HDPE) homopolymers or copolymers, wherein each type of polyethylene can be unimodal or multimodal with respect to molecular weight distribution.

6. The DC power cable according to claim 1, wherein the polyolefin (a) is a medium density polyethylene (MDPE) copolymer or high density polyethylene (HDPE) homopolymer or copolymer.

7. The DC power cable according to claim 1, wherein the polymer composition comprises the polyolefin (a) in an amount of at least 75 wt %, of the total weight of the polymer component(s) present in the polymer composition.

8. The DC power cable according to claim 1, wherein the hydrotalcite is present in an amount of 0.005 to 0.05 wt % based on the total weight of the polymer composition.

* * * * *